June 17, 1969  S. S. STATA  3,450,429
RECESSED REMOVABLE AND REPLACEABLE COMBINATION PAN
AND FLOOR GRATE FOR MOTOR VEHICLES
Filed June 2, 1967
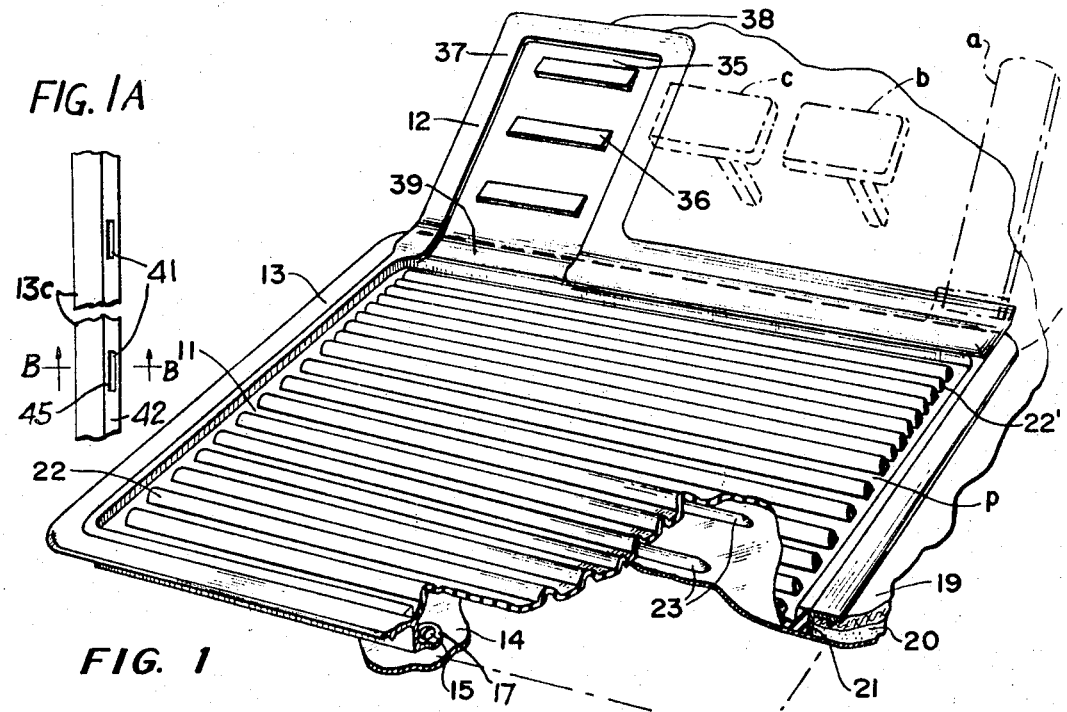
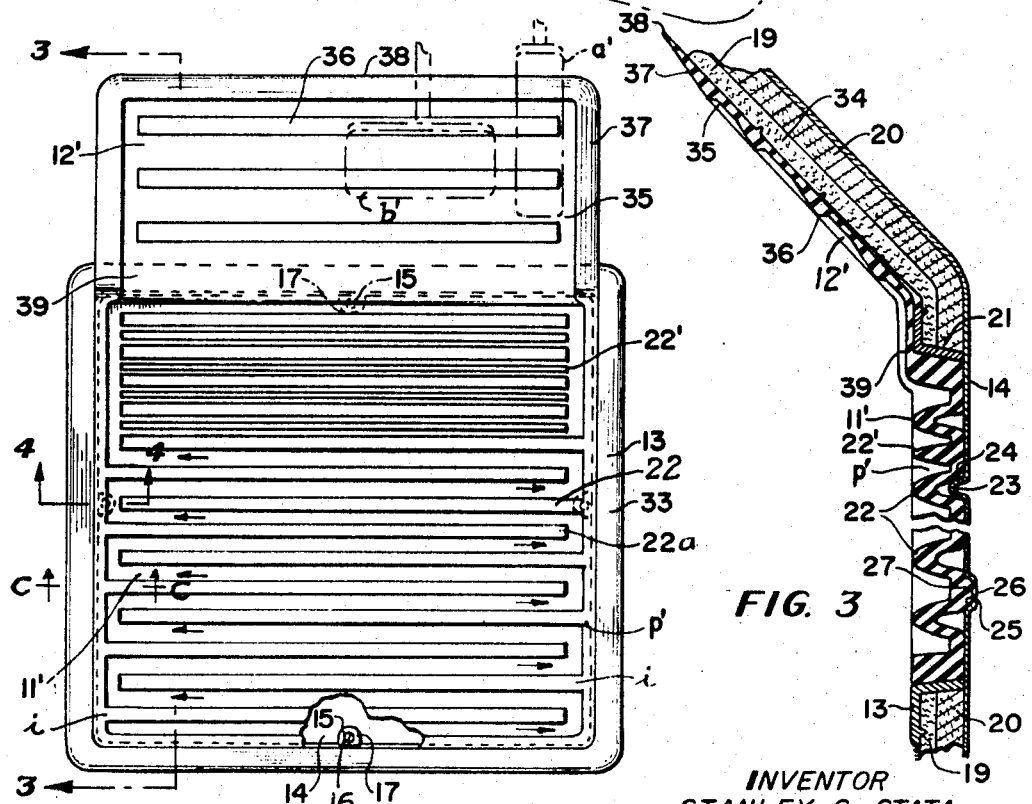
INVENTOR
STANLEY S. STATA

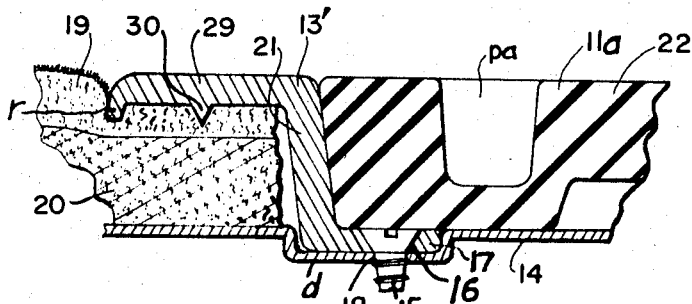
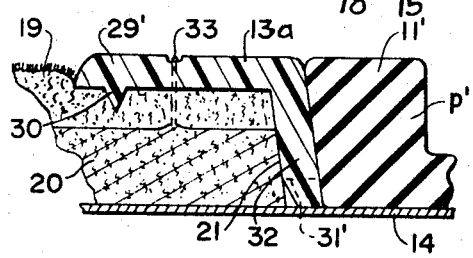
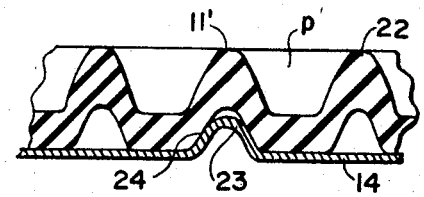
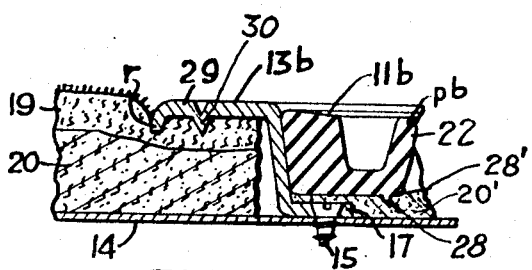
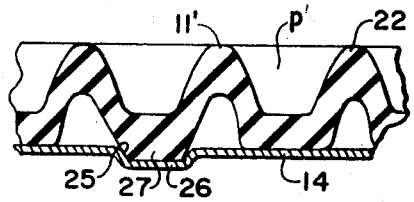
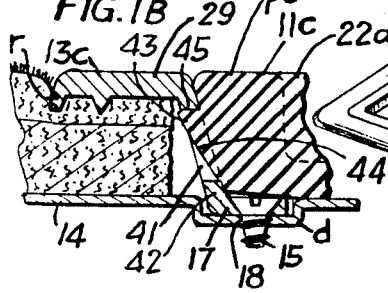
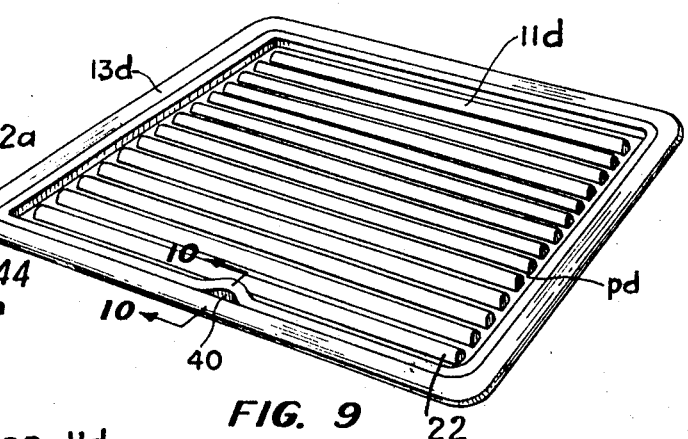
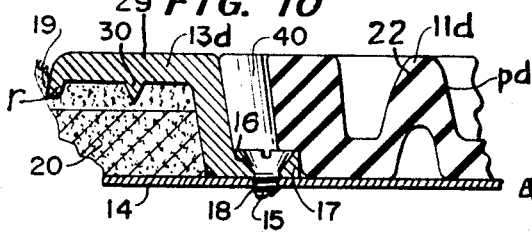

United States Patent Office 3,450,429
Patented June 17, 1969

3,450,429
RECESSED REMOVABLE AND REPLACEABLE
COMBINATION PAN AND FLOOR GRATE
FOR MOTOR VEHICLES
Stanley S. Stata, 301 Longwood St.,
Rockford, Ill. 61107
Filed June 2, 1967, Ser. No. 643,198
Int. Cl. B66; B62d 25/20; A47l 23/22
U.S. Cl. 296—1                                    17 Claims

ABSTRACT OF THE DISCLOSURE

A floor mat of sufficient depth between the shoe scraping ribs thereof to serve as a pan for collection moisture and dirt in the anticipated amount, retains the moisture in the recesses between the ribs during evaporation while leaving the top surface of the ribs fairly dry. A generally rectangular opening is provided in the carpet in which the generally rectangular pan fits and rests either directly on the sheet metal floor or on a layer of jute, and, in either event, is held in place by means of a fixed relatively rigid retaining frame, framing the opening in the carpet. The frame, when fastened to the floor, has ears for that purpose, either set in locating depressions formed in the floor, or fastened to the flat top surface thereof. While the pan is usually more easily removable from the frame, retaining lugs may be provided projecting horizontally from the edges of the pan and having snap-in engagement in openings provided in the frame to secure it in place detachably. The shoe scraping ribs in the pan, arranged to slow down flow of water by causing zig-zag flow crosswise of the pan, have their ends joined to the side walls of the pan adjacent the points where these lugs are located whereby to reinforce the wall and back up the lugs for better locking action. The frame in the case of rear seat passengers is also of generally rectangular form with the pan fitting snugly therein on all four sides or fastened by lugs, as just stated, but, in the case of the driver's position and the front passenger's position, the four sided frame also has the pan portion of the mat snugly engaged therein or fastened by lugs, as stated, while a thinner, forwardly extending, ribbed shoe scraping toeboard portion extends over the front portion of the frame and is flexed upwardly to rest on the carpet of the toeboard and drain freely into the pan. The pan is removable for washing and cleaning but is adapted to be cleared of dirt with a vacuum cleaner on other occasions.

This invention relates to a new and improved recessed removable and replaceable combination pan and floor grate for motor vehicles.

Th principal object of my invention is to provide a floor mat of sufficient depth between the shoe-scaping ribs thereof to serve as a combination pan and floor grate to collect moisture and dirt in the anticipated amount, the moisture being retained in the recesses between the ribs during evaporation while leaving the top surfaces of the ribs fairly dry, and the mat being designed to fit in an opening in the carpet and rest either directly on the sheet metal floor of the motor vehicle or on a layer of jute, while held in place by means of a fixed relatively rigid retaining frame framing the opening in the carpet. The frame is fastened either to the floor or the carpet, and, when fastened to the floor, has ears for that purpose, either secured in locating depressions formed in the floor, or fastened to the flat top surface thereof. While the pan is usually more easily removable from the frame, retaining lugs may be provided projecting horizontally from the edges of the pan is spaced relation and having snap-in slots or engagement in openings provided in the frame to secure it in place detachably. In that case, the parallel shoe scraping ribs in the pan, disposed in staggered relation to slow down flow of water by causing zig-zag flow crosswise of the pan, have their ends joined to the side walls of the pan adjacent the points where these lugs are located, whereby to reinforce the wall there and back up the lugs for firmer locking action. In the case of the floor mat for the driver's position and the front passenger's position, the mat includes a thinner forwardly extending ribbed foot scraping toeboard portion on the front end thereof which is flexed upwardly to rest on the carpet of the toeboard and drains freely into the main body portion of the pan, the toeboard extension extending over the front cross-portion of the frame. In the case of the floor mat for the driver's position, the toeboard extension extends the full width of the pan if the brake pedal and accelerator pedal are of the more recent design extending downwardly from the instrument board to a level above the toeboard, otherwise the toeboard extension on the mat is narrower and extends upwardly on the left-hand side of the steering column. In any case, the toeboard extension has tapered edges enabling the sweeping of dirt off the carpet of the toeboard onto the toeboard extension for ultimate collection in the pan, the flanged retaining frame also permitting sweeping of dirt off the carpet on the floor over it and directly into the pan. The floor mats for the rear passengers are likewise disposed in openings in the carpet and rest directly on the floor or on a layer of jute and are removably mounted in generally rectangular frames fastened either to the floor or to the carpet, similarly as in the other forms. Thus, the mats in all four locations, although held in position by snug fit and matching tapers on mat and frame, as well as interfitting of ribs on the floor in the bottom of the mats, and vice versa are easily removable and replaceable, thereby enabling throughly washing and drying the same at intervals for neatness in appearance, when the occasional cleaning out with a vacuum cleaner is not considered thorough enough.

The invention is illustrated in the accompanying drawings, in which:

FIG. 1 is a perspective view of a floor mat and a retaining frame combination made in accordance with my invention, the mat shown being for the driver's position and having a narrow front toeboard portion, as required where the brake pedal and accelerator pedal both project from the toeboard;

FIGS. 1A and 1B are, respectively, a fragmentary top view of a portion of a retaining frame having longitudinally spaced openings or slots, an intermediate portion of the frame being broken away to permit showing more than one, and a cross-section on line B—B of FIG. 1A showing how this frame cooperates with a pan having projecting lugs that wedgingly snap into the openings to secure the pan detachably and having the staggered arrangement of parallel shoe scraping ribs shown in a portion of FIG. 2, the ribs of the pan seen in section in FIG. 1B being on line C—C of FIG. 2;

FIG. 2 is a plan view of a floor mat and retaining frame combination similar to FIG. 1 usuable interchangeably at the driver's position or the passenger's position, assuming the mat is used in a new model car having the brake pedal and accelerator pedal projecting downwardly from the instrument board as indicated in dot-and-dash lines, this pan having the rear ten shoe scraping ribs in staggered relationship for the zig-zag flow of water mentioned above;

FIG. 3 is a cross-section on the line 3—3 of FIG. 2 on a larger scale, an intermediate portion of the mat and floor being broken away to enable showing the parts on this enlarged scale;

FIG. 4 is a still further enlarged sectional detail on the line 4—4 of FIG. 2, showing how the frame frames the opening in the carpet and illustrating a variation in which the ears on the frame for fastening with sheet metal screws to the floor are set in locating depressions formed in the floor;

FIG. 5 is a similar section of another form showing a frame of molded plastic or rubber without fastening ears but having a top flange fastened suitably to the carpet by stitching;

FIGS. 6 and 7 are enlarged sectional details of portions of FIG. 3;

FIG. 8 is a related section of another form having a stamped sheet metal frame and showing how a slightly shallow pan may be provided resting on a layer of jute or other compressible sound deadening and insulating material;

FIG. 9 is a perspective view of a floor mat and retaining frame combination along the lines of FIGS. 1 to 3 but designed for use by rear seat passengers, and FIG. 10 is an enlarged sectional detail on the line 10—10 of FIG. 9.

Similar reference numerals are applied to corresponding parts throughout the views.

Referring first to FIGS. 1 to 3, 6, and 7, the reference numeral 11 in FIG. 1 designates a flexible floor mat made in accordance with my invention, and the mat 11' in FIGS. 2 and 3 and related views FIGS. 6 and 7, is closely similar. The mat 11 in FIG. 1 is designated for use at the driver's position, the same having only a narrow toeboard extension 12 on the left-hand side to be disposed on the toeboard carpet to the left of the steering column and hence out of the way of the clutch pedal $c$, brake pedal $b$ and accelerator pedal $a$. Mats 11 and 11' both have the toeboard extensions 12 and 12' molded integral with a pan $p$ and $p'$. 13 designates the rigid generally rectangular retaining frame for the pan, the toeboard extension extending over the front end of the frame 13, the mat being molded of flexible rubber or plastic material and the frame being relatively rigid and molded or die-cast of aluminum or punched from sheet metal to a generally rectangular form and adapted to be fastened directly to the flat top of the sheet metal floor 14 by sheet metal screw 15, which, as shown in FIGS. 1, 2, and 10, are entered in holes 16 in ears 17 provided on the frame, the screws threading in holes 18 pierced in the sheet metal floor 14. Four of these screws are indicated in FIG. 2, one at the middle of each of the four sides of the frame 13, that many being considered sufficient for rigid fastening of the frame. The mat and frame combination will be provided as original equipment on a car, when, of course, the carpet indicated at 19 and the underlying jute or its equivalent 20 can have a generally rectangular hole 21 cut therein large enough to accommodate the frame 13 and exposed the sheet metal floor 14 for the main body portion of pan $p$ or $p'$ to rest directly thereon. If depressions $d$ are defined in the floor 14 at the outset at the four locations for the ears 17, as shown for frame 13' in FIG. 4, assembly time is reduced and closer uniformity of production assured. Holes 18 for screws 15 can also be pierced at the same time, thus reducing effort and saving more time. It also offers the advantage of having the ears 17 lie flush with the top of the floor. The pan $p$ has shoe scraping ribs 22 molded integral therewith in spaced parallel relationship crosswise of the pan, the space left in the pan being enough to retain an anticipated amount of dirt and moisture, the latter, being spread out, being usually evaporated quickly. Ribs 22 are preferably hollow, for savings in material, as shown, but other narrower solid ribs 22' are preferably provided between a few of the front rows of ribs 22 to serve as heel rests. The rear ten ribs 22a in pan $p'$ of FIG. 2 are shown in staggered relationship, alternate ones integral at one end $i$ with the left side wall of the pan and intermediate ones integral at the other end with the right side wall of the pan, to slow down flow of water in the pan by reason of the water having to flow in a zig-zag fashion as indicated by the arrows. This construction also offers a further advantage described in connection with the description of FIGS. 1A and 1B. If the floor 14 has embossed ribs 23 provided thereon, as shown in FIGS 1 and 6, the pan $p$ or $p'$, provided as a part of the original equipment for the car, will have grooves 24 provided therein to receive these ribs 23 with a snug fit to hold the mat against shifting about in the frame in the event of heavy pressure being applied in the scraping of dirt from shoes. On the other hand, the floor 14 may have grooves or recesses 25 defined by downwardly projecting ribs 26, as shown in FIG. 7, in which case the bottom of the pan $p$ or $p'$ will be provided with downwardly projecting ribs 27 fitting closely in these recesses for a similar purpose. In some cars there may be both embossed ribs 23 and depressed ribs 26, as shown in FIG. 3, in which case, in the event of original equipment, the bottom of pan $p$–$p'$ will be molded to fit the contour of the metal floor of the motor vehicle, as may be necessary.

In FIG. 8 I have shown another form in which a frame 13b is of stamped sheet metal and a layer of jute or other compressible sound deadening material is provided, as indicated at 20', for insulated and cushioned engagement of the pan $pb$ of mat 11b, the pan $pb$ in this instance being sufficiently shallower than the pans $p$ and $pa$ to enable having the layer 20' of jute or other material thereneath and have the pan as a whole recessed in the frame. In this construction, the pan $pb$ is slightly more yieldable under foot pressure than one resting directly on the floor 14, due to the yieldable material 20' and has wedging engagement in the frame 13b. The bottom of the pan $pb$ is shown as having a series of integral conical projections 28, which, by embedding in the jute 20', serve to prevent shifting of intermediate portions of the pan $pb$ relative to the floor. The bulging upwardly of the jute or other materials as at 28', inside the hollow ribs 22 also serves this purpose.

The frames 13, when fastened by screws 15 to the floor 14, have their marginal horizontal flange portions 29 impressed sufficiently in the carpet 19, as shown with frame 13' in FIG. 4, to have the top surfaces thereof substantially flush with the carpet, so that dirt can be swept off the surrounding carpet over the flanges 29 and into the pan. Staggered conical projections 30 and downwardly extending ribs $r$ provided on the underside of the flanges 29 serve, by embedding in the carpet, as seen in FIGS. 4, 8, 10, and 1B, to prevent the carpet from puckering up or pulling out.

The frame 13a shown in FIG. 5 is slightly flexible, being molded fairly thick of rubber or plastic material with the rim 31 thereof resting directly on the floor 14 and the marginal horizontal flange portions 29' stitched to the carpet 19, as indicated at 33. Here again, there are conical projections 30 provided in staggered relation on the underside of the flange 29' which serve by embedding in the carpet to prevent the carpet from puckering up or pulling out. The pan $p$ or $p'$ fits snugly inside the frame 13a and rests preferably directly on the floor, as shown, but, if preferred, a layer of jute, as at 20' in FIG. 8, may be provided for the pan to rest upon, in which event the frame 13a would be made shallower, as indicated in dotted lines at 31'. In the latter event, the pan would, of course, also be made somewhat shallower similarly, as at $pb$ in FIG. 8, and have conical projections 28 on the bottom thereof to embed in the jute for a similar purpose.

Referring to FIGS. 1 and 2, the toeboard extensions 12 and 12' are molded integral with the pans $p$ and $p'$ and are generally rectangular in form and disposed normally in coplanar relationship to the top of the pans but adapted to be flexed upwardly to rest on the carpet of the toeboard. The extension 12' is a full width toeboard extension, specially designed for use in later model cars that have the accelerator pedal $a'$ and brake pedal $b'$ extending downwardly from the instrument board in spaced relation to the toeboard. Obviously, the mat 11' shown in FIG. 2 may therefore be used equally well for the driver's position or in the front passenger's position. The toeboard extensions 12 and 12', as clearly seen in FIG. 3, are thinner than the pans and normally disposed in coplanar relationship to the top of the pan but flexed upwardly at an angle of approximately 45° to rest on the carpet on the toeboard 34. The toeboard extensions 12 and 12' each have a shallow generally rectangular recess 35 provided therein from which project a plurality of foot scraping ribs 36 of small height extending crosswise of the extension in widely spaced relation, from which there is good drainage at 39 into the pan. Thus, there is no occasion for any moisture scraped off the shoes on the mat getting onto the carpet 19, whether it be in using the ribs 36 of small height or the other ribs 22 of greater height. All the moisture is retained in the pan until evaporated, and, of course, all of the dirt is also retained therein, but the top surfaces of the ribs remain fairly dry. The marginal edges 37 of the toeboard are tapered down to a rather thin edge 38, as seen in FIG. 3, making is an easy matter to sweep dirt from the adjacent toeboard carpet onto these toeboard extensions to be ultimately collected in the pan.

Referring next to FIGS. 9 and 10, the floor mat 11d shown here is designed for use in each of the two rear seat locations, the same comprising only a pan pd fitting in a generally rectangular retaining frame 13d. Frame 13d is shown in FIG. 10 as fastened by screws 15 to the floor 14, the screws extending through holes 16 in ears 17 and threading in holes 18 that are pierced in the floor 14. There is the same snug engagement of the pan pd in the frame 13d as in some of the other constructions previously described. However, inasmuch as there is no toeboard extension 12 or 12' as in the first two forms shown, which afford a means of one's taking hold of and applying a pull to withdraw the pan from the frame, I provide a notch 40 in one edge of pan pd at the middle of one side thereof in which one may enter a finger or the end of a screwdriver bit or other prying tool to lift the pan enough so that it can be taken hold of at one edge to be pulled upwardly out of the frame. The notch 40 could be provided in the frame instead, although if the pan fits loosely enough to permit lifting it by taking hold of a rib 22, then no notch is needed. The frame 13d has screws 15 fastening the same to the floor at the middle of each of the four sides thereof, ears 17 being provided on the frame 13d for this purpose at all four locations.

Referring to FIGS. 1A and 1B the generally rectangular frame 13c which is fastened to the floor 14 by screws 15 in ears 17 received in depressions d, the same as the frame 13', has a plurality of rectangular openings or slots 41 provided therein in horizontally spaced relation, as, for example, three or more in each side, in the inclined inner, wall 42 thereof, preferably in alignment with the ends i of ribs 22a as indicated by the section line C—C in FIG. 2. The pan pc, which is generally rectangular and forms an integral part of the floor mat 11c, otherwise similar to mats 11, 11' and 11a, with or without a toeboard extension 12 or 12', and molded of rubber or plastic material having the requisite flexibility and resilience, has generally rectangular lugs 43 projecting horizontally therefrom on all four sides in register with slots or openings 41, the outer ends 44 of which are inclined at a greater angle than the walls 42, so that these lugs can snap into the slots 41 and under the shoulders 45 defined by the upper ends of the slots after wedging engagement on the inner side of the walls 42 as the pan pc is pressed down into place, the lugs 43 thereby detachably securing the pan in place. One can raise the toeboard extension and use it as a handle in pulling the pan portion of this mat out of the frame. Ribs 22a terminating integral with the side walls of the pan pc at the lugs 43 reinforce these side walls at these locations so that the side walls are less readily yieldable than the front and rear walls, for example, so these lugs have a better locking action than lugs 43 on the front and rear walls. Thus, the staggered arrangement of the ribs 22a offers a further and highly desirable advantage.

It should be clear that so long as the mats remain in place in their retaining frames, any dirt, water, or snow on the bottom of a person's shoes can be quickly and easily disposed of by scraping on the ribs 22 in the pans p or p', pa, pb, pc, or pd, and, inasmuch as the frames 13, 13', 13b, 13c, and 13d, when fastened tightly by screws 15 have their marginal flanges 29 and rims r impressed in the carpet 19, it is an easy matter to sweep dirt from the carpet around the mats into the pans to keep the interior of the car as neat as possible. Then, assuming vacuum cleaning of the mats is not sufficient, as, for example, because of unsightly smears of dirt that might not otherwise be so easily removed from the ribs 22, the mats can be removed readily enough for thoroughly washing and drying the same, and they can be replaced in the frames easily with little or no pressure applied to the marginal edge portions of the pans to get them substantially flush with the top of the retaining frames.

It is believed the foregoing description conveys a good understanding of the objects and advantages of my invention. The appended claims have been drawn to cover all legitimate modifications and adaptations.

I claim:

1. In a floor mat construction for vehicles having a substantially horizontal floor overlaid with carpet of compressible material in which there is a generally rectangular opening large enough to accomodate a floor mat resting on the floor and its retaining frame resting on the carpet, a generally rectangular frame of relatively rigid material closely received in the opening and having a marginal flange portion resting on and arranged when secured in place to compress the surrounding carpet so that the flange lines more nearly substantially flush with the carpet, means for securing said frame in place in said opening, the flanges having downwardly tapered outer edges to facilitate sweeping of dirt off the carpet around said frame over said frame, a floor mat of flexible material which includes a generally rectangular pan fitting closely but removably in said frame and resting on said floor, and shoe scraper means provided in said pan whereby dirt and moisture scraped from the bottom of shoes is retained in said pan for evaporation of moisture while the top of said scraper means remains fairly dry, the top of said pan lying substantially flush with the top of said frame to facilitate sweeping of dirt from the carpet around said frame over it into said pan.

2. A floor mat construction as set forth in claim 1 wherein the frame has downwardly and inwardly sloping inner sides against which matching inclined surfaces provided on the outer sides of said pan have snug engagement when the pan is entered in said frame.

3. A floor mat construction as set forth in claim 1 wherein the floor mat includes a generally rectangular flexible toeboard extension that extends over the front of the frame and is intergral with the front end of the pan, said extension having the bottom thereof normally in substantially coplanar relationship to the top of the pan being flexible upwardly to overlie the carpet on the upwardly inclined toeboard portion of the floor.

4. A floor mat construction as set forth in claim 1 wherein the floor mat includes a generally rectangular flexible toeboard extension that extends over the front of the frame and is integral with the front end of the pan, said extension having the bottom thereof normally in substantially coplanar relationship to the top of the pan and being flexible upwardly to overlie the carpet on the upwardly inclined toeboard portion of the floor, the toeboard extension having a generally rectangular recess provided therein communicating at the rear thereof with the front portion of said pan so as to drain into said pan.

5. A floor mat construction as set forth in claim 1 wherein the floor is of sheet metal and within the opening in the carpet has reinforcing ribs provided thereon with which the bottom of the pan has portions formed for interfitting engagement whereby to resist shifting of the pan relative to the floor in the opening in said carpet while retained in said frame.

6. A floor mat construction as set forth in claim 1 wherein the floor is of sheet metal and within the opening in the carpet there are interfitting portions defined on the floor and on the bottom of the pan to resist shifting of the pan relative to the floor in the opening in said carpet while retained in said frame.

7. A floor mat construction as set forth in claim 1 wherein the carpet on the floor overlies a layer of compressible sound deadening and insulating material, some of which covers the floor in the opening in said carpet and has the pan resting thereon for cushioning and sound deadening action, the underside of the pan having spaced downward projections which by engagement in the sound deadening and insulating material serve to resist shifting of the pan relative to the floor while retained in said frame.

8. A floor mat construction as set forth in claim 1 wherein the carpet on the floor overlies a layer of compressible sound deadening and insulating material, some of which covers the floor in the opening in said carpet and has the pan resting thereon for cushioning and sound deadening action, the shoe scraper means in said pan comprising scraping ribs formed integral with the bottom of the pan, said ribs being hollow and open on the bottom surface of the pan, the compressible sound deadening and insulating material being adapted to bulge upwardly into these openings to prevent shifting of the pan relative to the floor while retained in said frame.

9. A floor mat construction as set forth in claim 1 wherein the means for securing said frame in place in said opening ties the flange portion of said frame to said carpet around the opening therein, the flange portions of said frame having downward projections which are impressed in the carpet around the opening to anchor the frame to the carpet.

10. A floor mat construction as set forth in claim 1 wherein the pan is of compressible resilient material and the frame has shoulders defined thereon on the inner side thereof under which side portions of the pan after slight compression of said portions in entry of the pan are arranged to be engaged with a snap fit for detachably securing the pan in place in said frame.

11. A floor mat construction as set forth in claim 1 wherein the pan is of resilient compressible material and has lugs integral therewith and projecting horizontally outwardly from the sides thereof in spaced relation and the frame has openings provided therein in corresponding spaced relation to receive said lugs for detachably securing the pan in place in said frame, entry of these lugs in the openings requiring some compression thereof prior to entry.

12. A floor mat construction as set forth in claim 1 wherein the floor is of sheet metal and has depressions provided therein in spaced relation in the opening in said carpet, and the means for securing said frame in place in said opening comprises ears on the frame spaced like said depressions and arranged to engage therein to locate the frame on the floor, and means securing said ears to the floor.

13. In a floor mat construction for vehicles having a substantially horizontal floor, a generally rectangular frame of relatively rigid material having an inner side wall, means for securing said frame to the floor, a floor mat of flexible resilient material which includes a generally rectangular pan of resilient compressible material fitting closely but removably in said frame, shoe scraper means provided in said pan whereby dirt and moisture scraped from the bottom of shoes is retained in said pan for evaporation of moisture while the top of said scraper means remains fairly dry, the top of said pan lying substantially flush with the top of said frame to facilitate sweeping of dirt from the floor around said frame over it into said pan, the inner wall of said frame having substantially horizontal openings provided therein in longitudinally spaced relation, and lugs integral with and projecting horizontally from said pan and spaced to register with and engage in said frame openings for detachably securing the pan in place in said frame.

14. A floor mat construction as set forth in claim 13, wherein the outer sides of the pan fitting in the frame are inclined inwardly to match the inclination of the inner wall of the frame for snug engagement of said pan in said frame, and the lugs that enter said openings have their outer ends inclined inwardly similarly to the inner wall of the frame, whereby to facilitate entry of the pan in the frame, said lugs first having wedging engagement on the inner surface of said wall and then snapping into place in said openings.

15. A floor mat construction as set forth in claim 13 wherein the pan is of flexible resilient material and has side walls arranged to engage the inner side wall of said frame, the lugs projecting from said pan's side walls for engagement in the openings in said frame's inner side wall, the shoe scraper means in said pan comprising spaced substantially parallel ribs extending crosswise of said pan to receive dirt and water therebetween scraped off the bottom of shoes for evaporation of the water while the tops of said ribs remain fairly dry, a certain number of said ribs having alternate ones joined at one end to one side wall of said pan but spaced at the other end from the opposite side wall while intermediate ribs are joined at one end to the last named side wall and spaced at the other end from the first named side wall, whereby to slow down water flow in said pan by causing water collected in said pan to flow in a zig-zag fashion between these ribs, certain ones of these ribs each having the end that is joined to the pan's side wall disposed in longitudinal alignment with one of said lugs disposed on the other side of said wall, whereby said rib reinforces said side wall making it less yieldable for increasing the holding power of said lug when engaged in an opening in said frame's inner side wall.

16. In a floor mat construction for vehicles having a substantially horizontal floor, a generally rectangular frame of relatively rigid material, means for securing said frame to the floor, a floor mat which includes a generally rectangular pan fitting closely but removably in said frame, said pan having substantially vertical side walls the top of which lies substantially flush with the top of said frame to facilitate the sweeping of dirt from the floor around said frame over it into said pan, and shoe scraper ribs in said pan disposed in spaced substantially parallel relation extending crosswise of said pan and adapted to receive dirt water therebetween scraped off the bottom of shoes for evaporation of the water while the tops of said ribs remain fairly dry, said ribs having alternate ones joined at one end to one side wall of said pan but spaced at the other end from the opposite side wall while intermediate ribs are joined at one end to the last named side wall and spaced at the other end from the first named side wall, whereby to slow down water flow in said pan by causing water collected in said pan to flow in a zig-zag fashion between these ribs.

17. A floor mat construction as set forth in claim 13 wherein the floor is overlaid with a carpet of compressible material in which there is a generally rectangular opening large enough to accommodate the floor mat resting on the floor and the generally rectangular frame resting on the carpet, said frame having a marginal flange portion resting on and arranged when the frame is secured to the floor to compress the surrounding carpet so that the flange lies more nearly substantially flush with the carpet to facilitate sweeping of dirt off the carpet around said frame over said frame and into the pan portion of said mat, the top of which lies substantially flush with the top of said frame.

References Cited

UNITED STATES PATENTS 3,149,875   9/1964   Stata.
3,390,912   7/1968   Stata.

PHILIP GOODMAN, *Primary Examiner.*

U.S. Cl. X.R.

15—238; 180—90.6